July 16, 1946. W. D. GOODALE, JR., ET AL 2,403,974
SYSTEM FOR LOCATING THE SOURCE OF AN EXPLOSION WAVE
Filed Dec. 28, 1943
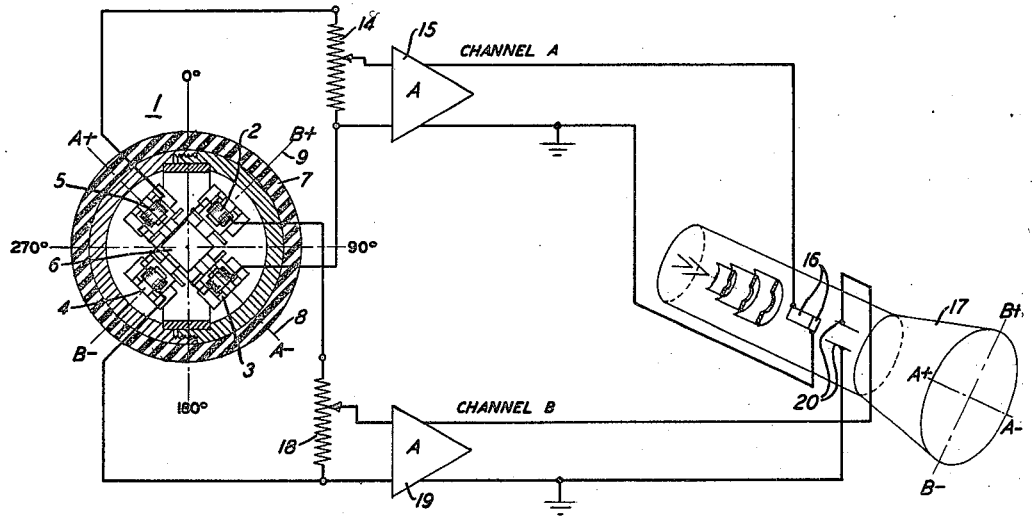
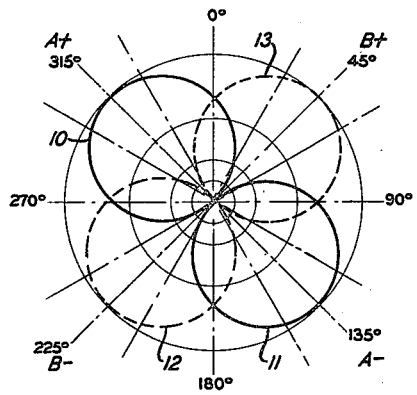
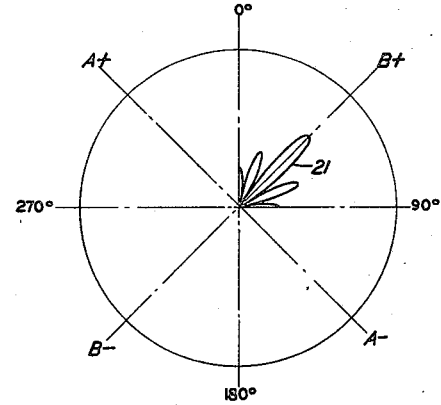
INVENTORS: W. D. GOODALE, JR.
B. F. LEWIS
W. H. MARTIN
BY W. C. Parnell
ATTORNEY Patented July 16, 1946

2,403,974

UNITED STATES PATENT OFFICE 2,403,974

SYSTEM FOR LOCATING THE SOURCE OF AN EXPLOSION WAVE

Walter D. Goodale, Jr., Convent Station, N. J., Benjamin F. Lewis, Bayside, N. Y., and William H. Martin, Summit, N. J., assignors to Bell Telephone Laboratories, Incorporated, New York, N. Y., a corporation of New York Application December 28, 1943, Serial No. 515,886

2 Claims. (Cl. 177—352)

This invention relates to the location of the point of origin of an explosion wave and the object of the invention is a system for quickly and uniquely determining the direction of an explosion from a pick-up point such for example as a submarine being subjected to depth bombing.

Explosion waves differ from ordinary sound waves in that the proportion of the total pressure of the wave due to the velocity of the particles of the medium through which the wave is being transmitted is very much larger in the case of an explosion wave. For this reason the first positive pulse of an explosion wave is of larger amplitude than the succeeding negative pulse or, in other words, the wave is an asymmetric transient.

According to this invention advantage is taken of this asymmetry to obtain the bearing of the point of the explosion without ambiguity by the use of two coincident pressure gradient type microphones having their axes of sensitivity disposed in quadrature. It is characteristic of such microphones that the magnitude of the electrical output for any sound pressure is proportional to the cosine of the angle of sound incidence and that the polarity of the output voltage reverses as the source of the wave crosses the microphone axes of zero sensitivity. Two such devices in quadrature will therefore give outputs of relative polarities which are distinctive of the quadrant from which the wave originated and of relative magnitudes which determine the angle of incidence within the quadrant.

In the drawing,

Fig. 1 is a sound locating system according to the invention;

Fig. 2 is a diagram of the directional characteristic of the microphone system, and Fig. 3 is a typical oscilloscope indication of the direction and range of the origin of the wave with respect to the pick-up point.

In Fig. 1 the pick-up 1 may be of the type more fully disclosed in the copending application of W. R. Harry, Serial No. 494,640, filed July 14, 1943, and comprising essentially four electromagnetic, inertia-type units 2, 3, 4 and 5 of the general construction disclosed in Patent 2,202,906, granted to Hawley, June 4, 1940. These units are mounted on the four faces of a square supporting bar 6 within a spherical shell 7 with the oppositely disposed units in axial alignment and the axes 8 and 9 of the pairs of units intersecting at the center of the shell.

Each of the units 3 and 5 has a double lobed directional pick-up characteristic as shown by the full line curves 10, 11 of Fig. 2 and similarly each of the units 2 and 4 has a characteristic as shown by the dotted curves 12, 13 so that the required pick-up pattern may be obtained as stated above by only two of the units such, for example, as 2 and 5. However, the four-unit structure shown is preferred because of its symmetry and by connecting the opposed units of each pair together in series-aiding relationship, the device becomes in effect a two-unit structure.

The units 3 and 5 are connected through a volume control 14 to an amplifier 15, the output of which is impressed on the plates 16, 16 of the oscilloscope 17 and the units 2 and 4 are similarly connected through a volume control 18 and an amplifier 19 to the plates 20, 20 of the oscilloscope. As indicated the plates 16 and 20 are conventionally disposed to deflect the ray in Cartesian coordinates and the oscilloscope is preferably oriented so that the observed deflection will be in the direction of the source to be located. This condition will obtain when the planes of the plates 16, 16 and 20, 20 are normal to the pick-up axes 8 and 9, respectively.

As shown by the curves of Fig. 2, for waves of 45 degrees or 225 degrees incidence the response of units 2 and 4 will be a maximum and the response of units 3 and 5 will be zero whereas for waves of 135 or 315 degrees incidence the response of units 3 and 5 will be a maximum and the response of units 2 and 4 will be zero.

For all intermediate angles of incidence both pairs of units respond but the voltage generated by each pair decreases in magnitude in accordance with the cosine law until at an angle of 90 degrees with respect to the unit axis the response is zero. It will be noted, however, that with this type of microphone the polarity of the voltage generated by each pair of units reverses as the wave source crosses the line of zero sensitivity of that unit.

Any explosion wave acting on such a structure with an angle of incidence within the upper quadrant from 315 degrees through 0 degrees to 45 degrees, will produce voltages of the same sign (e. g. positive) in the two units, while waves with angles of incidence in the lower quadrant, 135 degrees to 225 degrees, will also produce two voltages of the same sign but these will be opposite in polarity to those produced in the first quadrant. For waves from the second quadrant, 45 degrees to 135 degrees, the B channel voltage remains positive but the A channel voltage is now produced by reverse motion of the units 3 and 5 and is, therefore, of negative polarity as shown by the curve 11. Conversely, in the fourth quadrant, 225 degrees to 315 degrees, the units 3 and 5 generate a positive voltage, as indicated by the curve 10, but the B channel voltage is now produced by reverse motion of the units 2 and 4 and is, therefore, of negative polarity as shown by the curve 12.

Within any quadrant the relative magnitudes of the voltages generated by the two pairs of units will vary with the angle of incidence of the wave. In the first quadrant, for example, at 315 degrees the A channel voltage is a maximum and the B channel voltage is zero but as the angle of incidence changes to 45 degrees the A channel voltage decreases to zero while the B channel voltage increases to a maximum.

It will, therefore, be seen that taking into account both the polarities and magnitudes of the outputs of the two pairs of pick-up units, there will be a unique pair of voltage values for each angle of incidence.

The beam of the oscilloscope normally will be centered on the screen but upon the arrival of a pressure wave at the pick-up, it will be deflected momentarily in the direction corresponding to the unique pair of voltage values generated. Ideally the beam should move out and return in a straight line, but in practice it is found that due to various extraneous factors such as reverberation effects, a multilobed pattern appears.

However, as shown in Fig. 3 for a wave of 45 degrees incidence, there will be one main lobe such as 21 which clearly indicates on a suitable circumferential scale the direction of the origin of the wave from the pick-up point. For explosive charges of a known design, the volume controls 14 and 18 may be adjusted so that the radial length of the main lobe is a measure of the distance to the explosion point.

What is claimed is:

1. Apparatus for locating the source of an explosion wave comprising at least two inertia type pressure gradient microphones mounted on a common support with their axes of sensitivity in quadrature, a shell enclosing the microphones and means for producing a directional indication in accordance with the magnitudes and polarities of the outputs of the microphones produced by the first pulse of the wave produced by the explosion.

2. Apparatus for locating the source of an explosion wave comprising two inertia type pressure gradient microphone units mounted on a common support with their axes of sensitivity in quadrature, a shell enclosing the microphone units, a cathode ray oscilloscope having two pairs of plates for deflecting the ray in Cartesian coordinates, two electrically independent circuits connecting the microphone units to the pairs of plates and an amplifier and a volume control in each of the circuits.

BENJAMIN F. LEWIS.
WILLIAM H. MARTIN.
WALTER D. GOODALE, Jr.